(12) United States Patent
Burg et al.

(10) Patent No.: US 7,909,078 B2
(45) Date of Patent: Mar. 22, 2011

(54) METHOD FOR MEASURING GREEN TIRE COMPONENTS

(75) Inventors: Gary Robert Burg, Massillon, OH (US); Shaun Matthew Immel, Dover, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1315 days.

(21) Appl. No.: 11/300,978

(22) Filed: Dec. 15, 2005

(65) Prior Publication Data
US 2007/0137763 A1    Jun. 21, 2007

(51) Int. Cl.
*B29D 30/00* (2006.01)
*G01B 11/00* (2006.01)

(52) U.S. Cl. ..... 156/360; 156/123; 156/378; 156/394.1; 700/110; 700/303

(58) Field of Classification Search ........... 156/64, 156/123, 394.1, 405.1–406.6, 360; 700/108–110, 700/303
See application file for complete search history.

(56) References Cited

U.S. PATENT DOCUMENTS

| | | | |
|---|---|---|---|
| 4,414,843 A | 11/1983 | Kounkel et al. | 73/66 |
| 5,054,918 A * | 10/1991 | Downing et al. | 356/139.09 |
| 5,882,452 A | 3/1999 | Sakamoto et al. | 156/64 |
| 6,065,331 A | 5/2000 | Fukasawa | 73/146 |
| 6,124,925 A * | 9/2000 | Kaneko et al. | 356/237.1 |
| 6,386,945 B1 | 5/2002 | Fahringer et al. | 451/5 |
| 2007/0084541 A1* | 4/2007 | Moriguchi et al. | 156/117 |

FOREIGN PATENT DOCUMENTS

| | | | |
|---|---|---|---|
| DE | 102005021979 A1 * | 11/2006 | |
| JP | 4-193528 | 7/1992 | |
| JP | 2001-050721 A * | 2/2001 | |
| JP | 2001-212888 | 8/2001 | |
| JP | 2004-354259 A * | 12/2004 | |
| JP | 2005-233906 A * | 9/2005 | |
| KR | 20040110430 A * | 12/2004 | |
| SU | 1200149 A * | 12/1985 | |

* cited by examiner

*Primary Examiner* — Geoffrey L Knable
(74) *Attorney, Agent, or Firm* — Richard B. O'Planick (57) ABSTRACT

A method for analyzing and controlling the formation of a green tire component by component on a target region of a curved build surface includes: measuring in three dimensions each component on the target region by rotating the build surface past at least one optical scanner. The optical scanner directs a sheet or a plurality of sheets of light against a target region of the rotating build surface; and measures component by component build-up on the target region surface for component dimensional, positional, and mass parameters. Component by component measurements are made in three-dimensions by rotation of the target regions through the optical sheets of light and feedback from component measurements may be used to correct for tire imbalance and uniformity anomalies on a real-time basis.

11 Claims, 11 Drawing Sheets

METHOD FOR MEASURING GREEN TIRE COMPONENTS

FIELD OF THE INVENTION

The invention relates generally to a method for measuring green tire components in the formation of a green tire and, more specifically, to a method for measuring and controlling the formation of a green tire during component by component tire build-up in order to attain desired finished tire geometry and uniformity.

BACKGROUND OF THE INVENTION

It is a desired objective in tire manufacture to carefully control the formation of a pre-cure green tire so as to reduce tire imbalance and maximize tire uniformity. Heretofore, ensuring green tire balance and uniformity was a post-formation procedure, utilizing a single point laser gauge for measuring selective spots on the finished green tire. Conclusions based upon multiple single point measurements were then made and a determination reached as to whether the finished green tire was within acceptable quality specifications and parameters. Tires that did not meet preset specifications relating to uniformity and geometry were scrapped, resulting in costly waste.

While measuring a finished green tire by multiple data points to ascertain whether balance and uniformity characteristics are within specification can be useful for quality control purposes, relying on a post-formation procedure carries certain shortcomings. First, concluding that the finished green tire does not conform to balance and geometric uniformity specifications does not avoid costly waste resulting from scrapping a non-conforming tire. Moreover, the process of measuring the finished green tire by means of multiple single laser point scans is time consuming and does not provide sufficient information for effective real time feedback in order to correct green tire imbalance and geometric anomalies during build-up. Consequently, determining that a finished green tire does not conform to balance and uniformity specifications from a post-manufacture perspective is not timely, does not provide useful information for real time feedback, and does not reduce the cost of scrapping green tires that prove to be non-conforming.

Secondly, measuring a finished green tire by multiple single point measurements as a diagnostic methodology is less than satisfactory. Point measurement of a toroidal surface such as a tire does not generate sufficient geometric slices of the entire toroid to determine the quantitative influence of various geometric anomalies on tire balance and uniformity. Geometric variances and anomalies may escape detection in systems that employ point laser scanners. Measuring a finished green tire by means of single point laser scanner evaluation does not give sufficient information to allow the tire manufacturer to correlate, predict, and correct for tire imbalance and uniformity anomalies.

SUMMARY OF THE INVENTION

Pursuant to one aspect of the invention, a control system for the formation of a green tire on a toroidal surface is provided. Integrated multi-sheets of light are directed from multiple optical scanners on the toroidal surface. The sheets of light obtain numerous geometric slices of the entire toroid in a 180 degree U-shaped configuration. The optical scanners can thus scan and measure at high speed the entire toroid, as well as each component built up on the tire. Geometric data is thereby obtained from the scanning process by which to correlate, predict, and correct for imbalance and uniformity anomalies.

According to another aspect of the invention, each component is scanned as it is applied to the toroidal surface and component parameters such as contour, mass, and mass distribution. Calculations of component volume, component geometry, dimension and profile are made and stored. The centroids and differential masses of component cross-sections are thus determined and each component may be modeled as point masses located on a circumferential ring located at the cross-sectional centroids. An approximation of the mass properties of the in-process green tire is thus made component by component to determine tire imbalance.

A further aspect of the invention is to use intermediate calculations of component contribution to mass properties during build-up of each component to make corrections to placement and/or mass distribution (stretch or volumetric change) of subsequent component additions in order to compensate for imbalance.

Another aspect of the invention is to provide a method for analyzing and controlling the formation of a green tire component by component on a toroidal surface. The method includes: measuring a toroidal surface in three dimensions by directing one or more optical sheets of light against the rotating toroidal surface; measuring component by component build-up on the toroidal surface for component dimensional, positional, and mass parameters. Making component by component three-dimensional measurements on the in-process green tire build-up, and providing feedback from component measurements may allow a correction for tire imbalance and uniformity anomalies.

In a further aspect of the invention, the method includes measuring final component contour and generating feedback correction; modeling in real time the green tire for static, dynamic balance and force parameters component by component as the tire is built up; making dynamic adjustment of strip and/or component for balance and force; and comparing mass distribution data to Force Waveform patterns.

These and other aspects of the invention are achieved by a preferred embodiment that is described in detail and illustrated in the accompanying drawings.

DETAILED DESCRIPTION OF ILLUSTRATIVE EMBODIMENT

Figure 1:
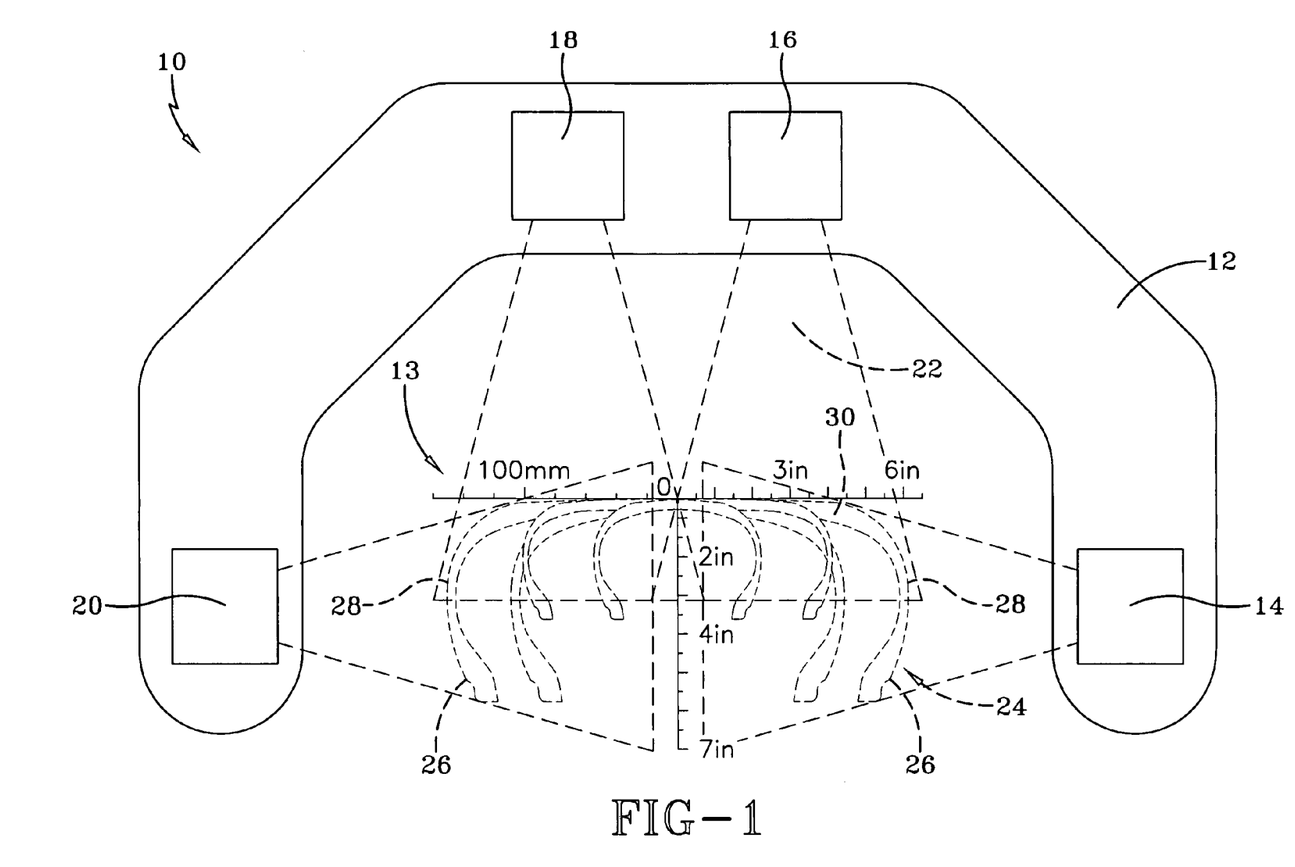
FIG. 1 is schematic representation of a green tire bead to bead profile measurement sensor assembly in a C-frame fixed station.

Referring first to FIG. 1, the subject sensor assembly 10 is shown schematically in a C-frame configuration and includes a free standing C-frame 12 that defines a central tire-receiving chamber 13. A pair of lateral sensors 14, 20 are mounted to opposite arms of the frame 12 and face inward into the chamber 13. A pair of central sensors 16, 18 are mounted at the center of the C-frame 12 and are directed inward into the chamber 13. Each of the sensors 14, 16, 18, and 20 directs a sheet of optical light 22 into respectively assigned regions of the chamber 13 as will be explained. Depicted in phantom in FIG. 1 are green tire sections of various sizes positioned within the chamber 13 in an orientation suitable for scanning pursuant to the invention. Each green tire carcass 24 generally includes opposite bead regions 26, sidewall regions 28, and a crown region 30.

While four sensors are shown in the illustrated embodiment of the invention, the invention is not so limited. More or fewer sensors may be deployed if desired for a particular application. The sensors 14, 16, 18, 20 are of a type that direct a sheet of laser-generated light on a target region and detect light reflected back from the target surface. The four sensors of FIG. 1, deployed as indicated, cover respective areas of the chamber 13 with sheets of light that form a combined pattern capable of scanning 180 degrees of a tire profile. Each sensor is spaced from its respectively assigned target region of the chamber 13 so as to focus on an assigned region of a green tire carcass 24. Adjustment means (not shown) for repositioning each sensor on the C-frame so as to focus the sheet of light from each sensor on its intended target region is contemplated. Adjustment in the position of each sensor will depend on the size of the tire to be scanned and the light dispersion pattern transmitted from each sensor. Each sensor is assigned a specified region of the green tire to illuminate the cumulative effect of all sensors being to scan 180 degrees of a green tire profile.

Optical sensors that employ a sheet of light to scan a target surface are commercially available. One suitable commercial source is a range of optical sensors sold by Bytewise Measurement Systems USA, of 1150 Brookstone Centre Parkway, Columbus, Ga. 31904. Typically available optical sensors can operate at a scan rate of 15 scans/second and are microprocessor controlled. The sensor sheet transmitted by the laser provides a width resolution of 0.1% at full scale eight inch wide sheet laydown; 0.025% thickness resolution at full scale eight inch sheet width emission. FIG. 1 shows the sensor sheet 22 coverage at various distances from the sensor. Positioning the sensors at appropriate distances from the target carcass 24 will result in the complete 180-degree toroidal coverage of the target bead to bead surface of the green tire carcass 24.

Figure 2:
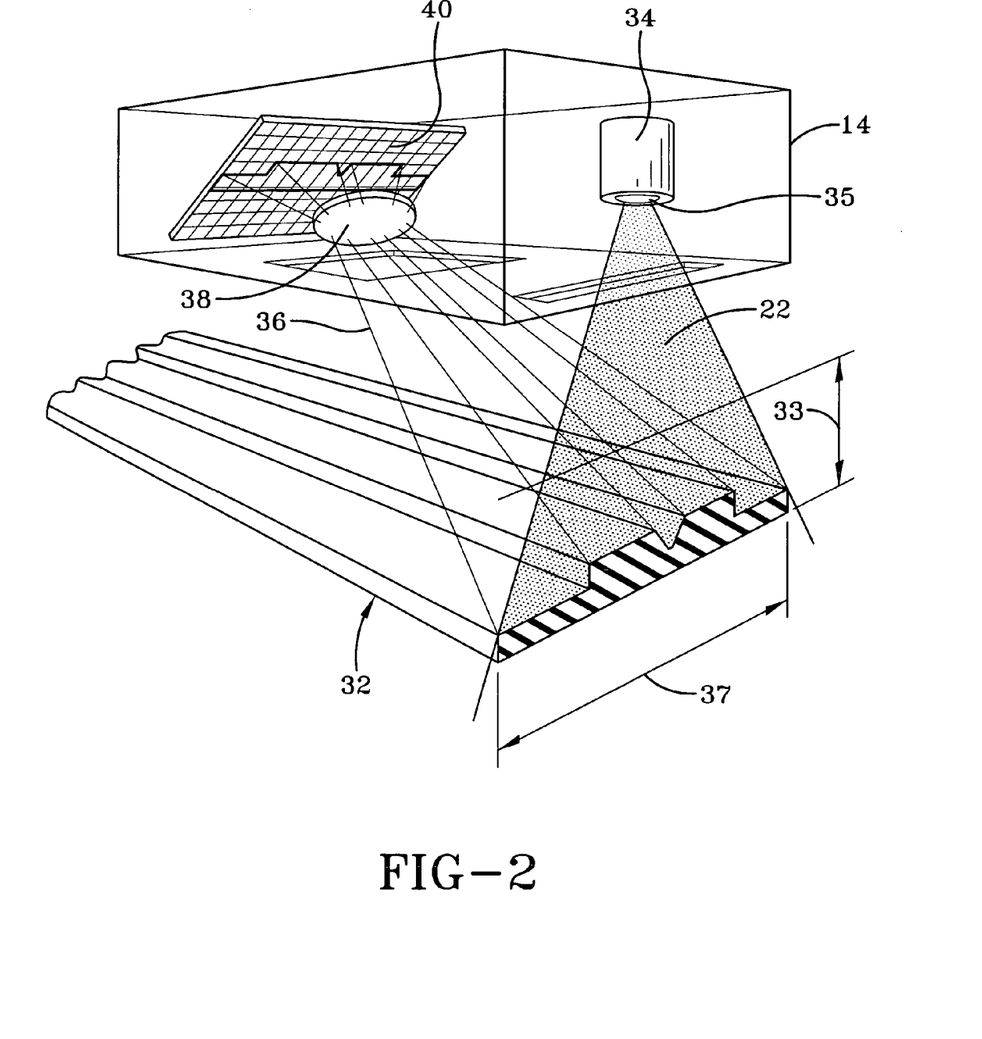
FIG. 2 is a schematic representation of a portion of the toroidal green tire and an optical sheet scanner disposed to scan and measure the green tire portion.

FIG. 2 illustrates in greater detail the operation of one of the sensors 14 relative to a target strip 32 of appropriate width. The sensor 14 includes a laser 34 having a light beam that is dispersed by lens 35 into the sheet of light 22. The light sheet 22 has a field depth 33 and a width 37. It will be appreciated that the relative position of the sensor 14 to the target strip 32 is adjusted so that the width 37 of the sheet 22 may illuminate the entire width of the strip 32. Light against the strip 32 will reflect upward through a lens 38 and to a detector 40. Detector 40 functions to interpret in three dimensions the reflected light and generate date indicative of the dimensions of the target strip.

Figure 3:
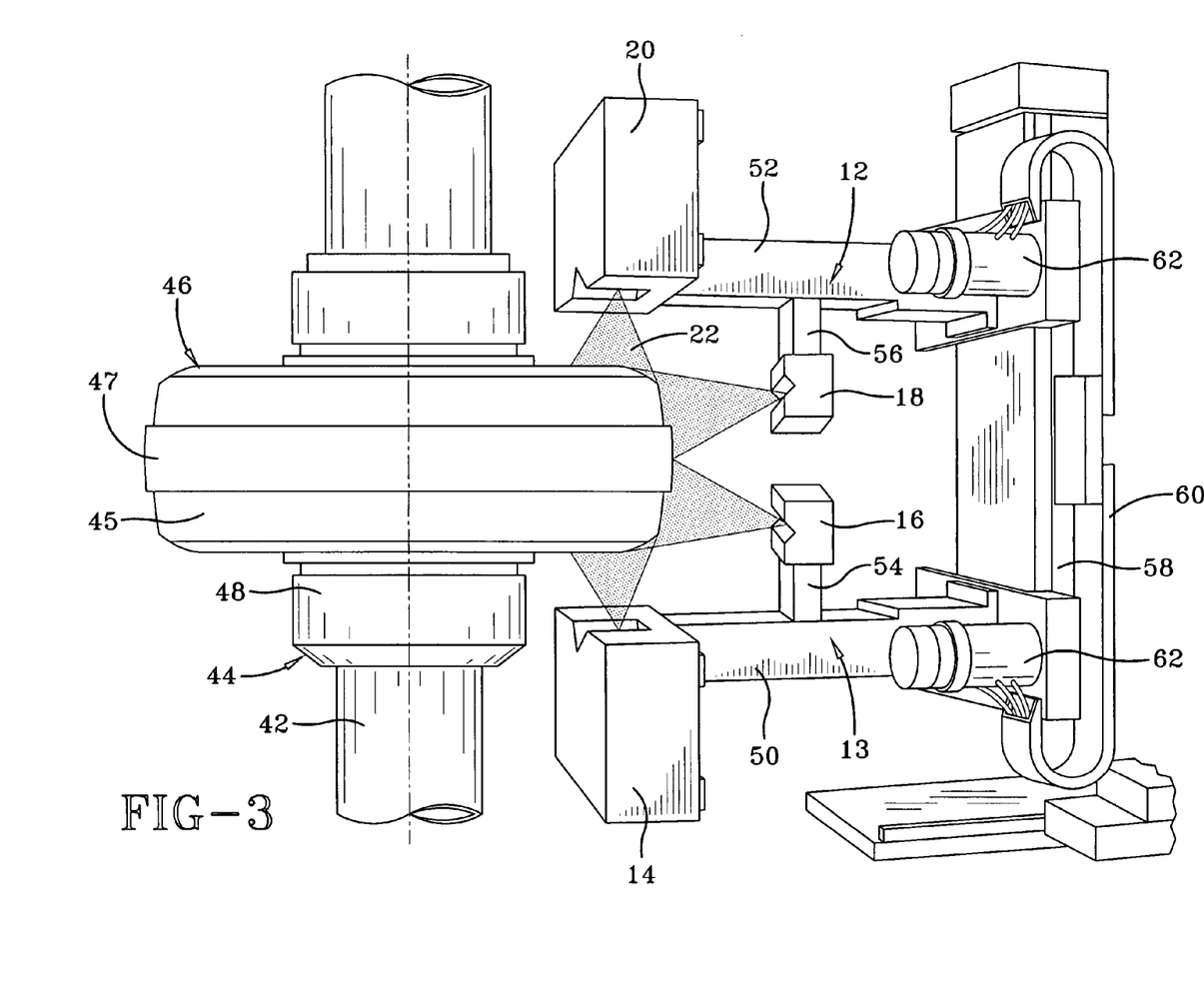
FIG. 3 is a perspective view of an alternative, adjustable multi-scanner station operatively disposed for bead to bead profile measurement of a green tire on a build core.

FIG. 3 illustrates an alternatively configured scanning setup in which a rotational shaft 42 rotates a core 44 on which a green tire carcass 46 is built component by component. The carcass 46 includes a plurality of layers 45 applied sequentially to an outer annular surface 48 of the core 44. The subject invention may be used to measure component by component build up on a curvilinear surface. As used herein, a "curvilinear surface" may be either annular, such as the outer surface of a build drum, or toroidal such as the outer surface of a core formed in the shape of a tire, or a complex asymmetrical curved surface. The methodology of the invention can be used in general manner on a curvilinear surface to measure component by component build up and finds particular application in component by component build up on an annular or toroidal form. A strip component 47, shown for the purpose of illustration, attaches to the green tire carcass 46 as a part of the build-up procedure. The tire 46 is moved radially into the chamber 13 of the C-frame either through movement of the tire or movement of the C-frame. So positioned, the green tire is located at a prescribed relationship between and with the sensors 14, 16, 18, and 20.

The structure in the embodiment of FIG. 3 includes a pair of support arms 50, 52 to which the sensors 14, 20, respectively, fixedly attach at a remote arm end. The sensors 16, 18 are fixedly attached to lateral support arms 54, 56 and extend into the chamber 13. A base 58 supports the arms 50, 52 and an electrical conduit duct 60 that electrically services motors 62. For the system depicted, the hardware includes the four sensors 14, 16, 18, 20; electrical cables; an encoder, and a controller and power supply (not shown). The software used includes a four-channel profile server, a viewer, and a data communications network, all commercially available.

Figure 4:
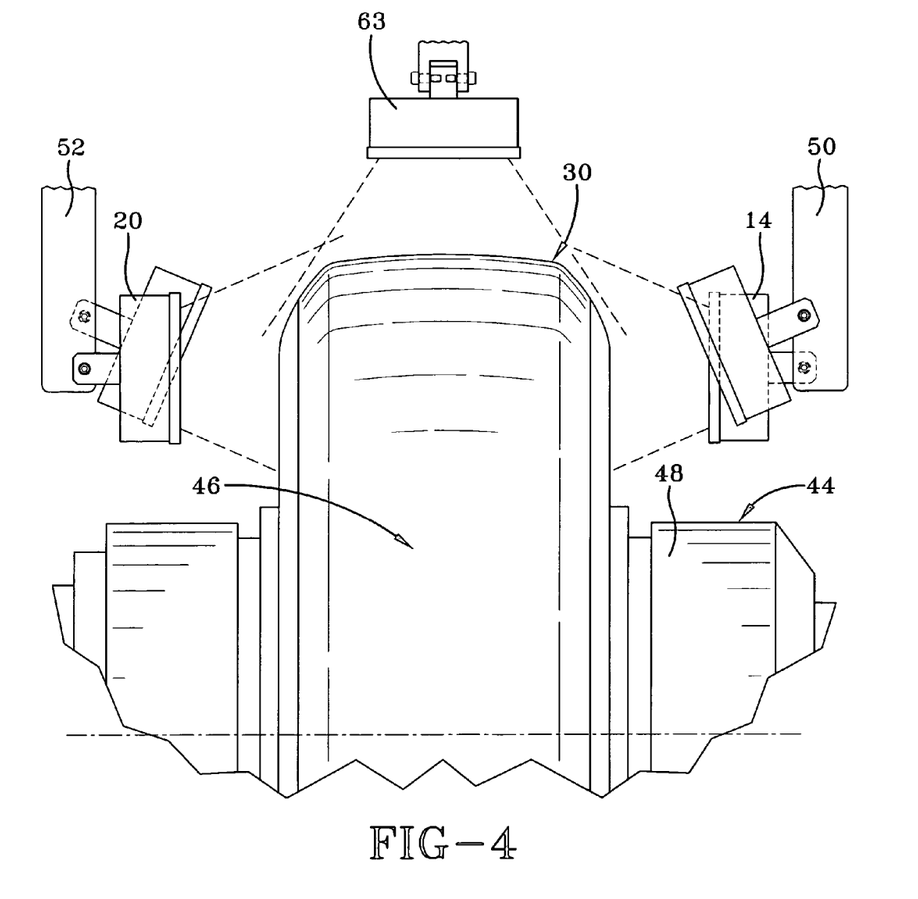
FIG. 4 is an enlarged schematic representation of a portion of a toroidal tire surface in scanning relationship to the multiple optical scanners.

It will be appreciated from FIGS. 3 and 4 that the sensors 14, 16, 18, and 20 may be pivotally mounted to allow for positional adjustment of the sensor beams to cover each sensor's respective target region on the green tire 46. Once in position, the sensors may be locked into place and scanning may commence. FIG. 4 shows a single sensor 63 disposed to scan the crown region 30 of the green tire 46, as an alternative to the four-sensor system of FIGS. 1-3. The green tire 46 rotates on the toroidal core surface 48. Each component added to the surface 48 during green tire build-up is scanned by the subject sensor system as the tire is rotated and date relating to the component is generated and stored. From the scanning procedure, the dimensions and thickness of the component may be determined and it may be determined whether the component is within tolerable specifications as to such parameters. Calculations based upon the component dimensions and thickness may also be conducted to determine the center of mass of the component. Data relating to the center of mass calculation is likewise stored. As explained in greater detail below, as the green tire is built, scanning data is taken of each component of the work-in-process green tire. The cumulatively effect of all component layers added may be used to calculate in real time the dimensions, volume, and mass distribution of the work-in-process green tire and, ultimately, the finished tire. Moreover, should anomalies be detected in the dimensions or mass distribution parameters of any component, feedback may be used to modify and adjust component parameters to compensate.

For example, referring to FIG. 3, strip 47 may be scanned to determine whether it falls within specification tolerances. Should a dimensional, or placement anomaly be detected by the scanners, the build-up process may be stopped and the anomaly corrected. Should the anomaly be detected during the application of the strip 47 on the green carcass surface 45, a feedback control signal may be used to adjust the characteristics of the strip 47 in real time to eliminate the anomaly while the strip is being applied. Imbalance estimation and correction during green tire build in real time is, thus, facilitated. Synchronous rotation of the in-process green tire with the scanners allows for a complete mapping of the toroidal tire surface. Anomalies that would otherwise go undetected by the use of point lasers are thereby identified.

Figure 5A:
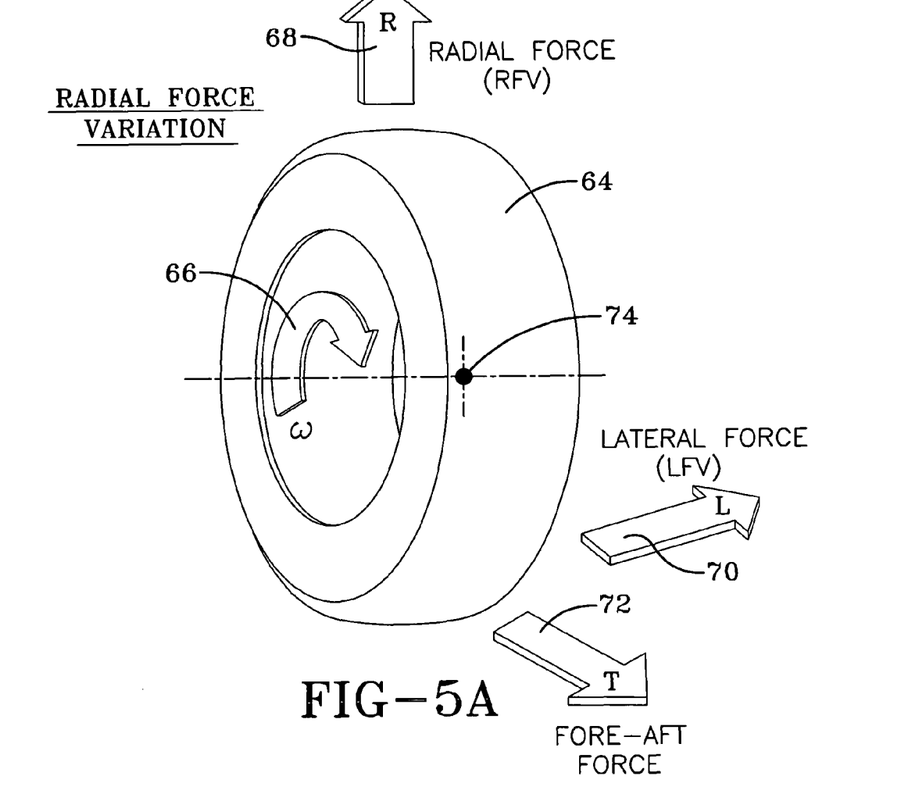
FIG. 5A is a schematic depiction of radial, lateral, and tangential force variation in a rotating tire.
Figure 5B:
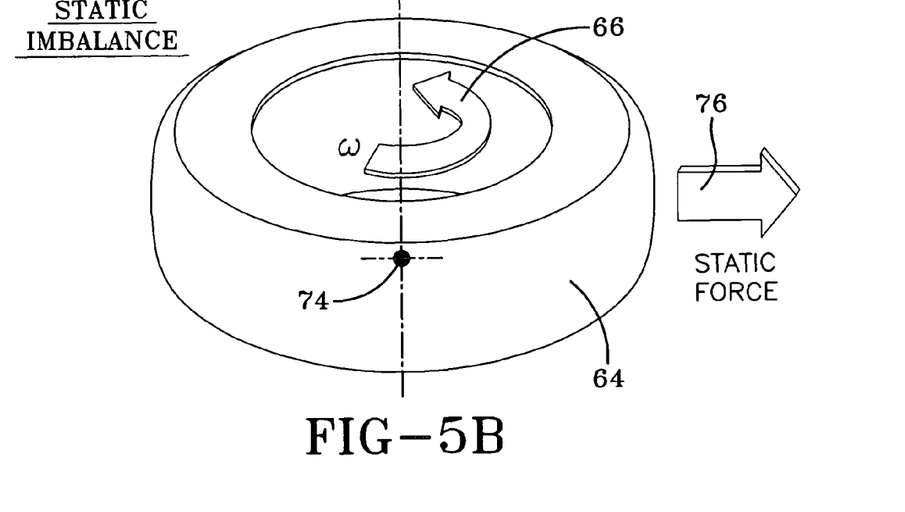
FIG. 5B is a schematic representation of static imbalance within a rotating tire.
Figure 5C:
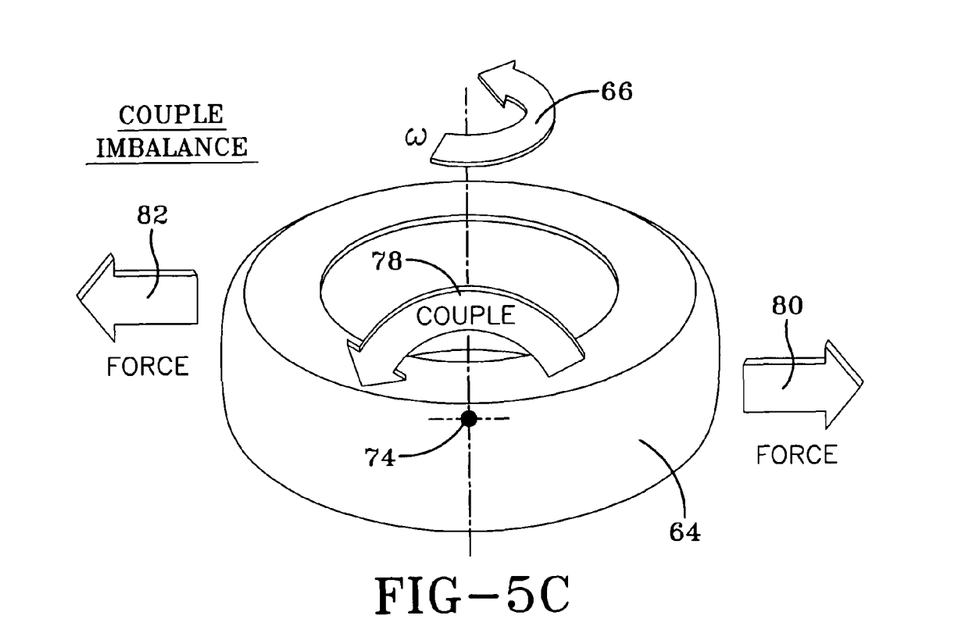
FIG. 5C is a schematic representation of couple imbalance in a rotating tire.
Figure 5D:
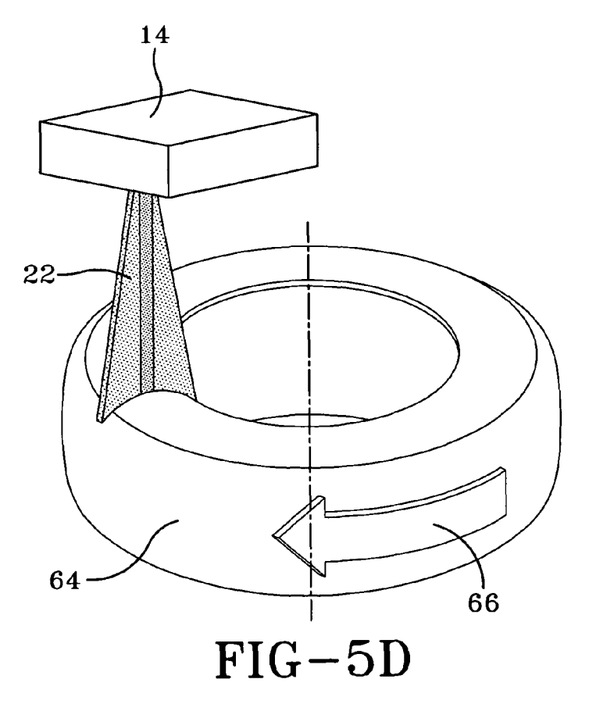
FIG. 5D is a schematic representation of an optical scanner disposed to direct a sheet of optical light upon the sidewall region of a rotating tire.

FIGS. 5A-D show a representative illustrative toroidal tire 64. In FIG. 5A, radial force variation is shown as rotational and static vectors. The value of such directional parameters may be calculated from data attained by the laser sheet scanning method of the subject invention. A tire rotating in direction 66 at an angular velocity ω results in a radial force vector 68 (RFV); a lateral force (LFV) vector 70; and fore-aft force vector 72. The effective tire center of mass 74 is as shown. The center of mass 74 magnitude and location, as well as the radial force variation vector quantities may be determined from the cumulative center of mass component calculations during build up of the green tire. In FIG. 5B, static imbalance in the rotating tire is shown by static force vector 76. FIG. 5C illustrates couple imbalance in a rotating tire by means of force vectors 80, 82. A sensor 14 pursuant to the invention is depicted in FIG. 5D in a scanning relationship to the tire 64 rotating in direction 66.

Figure 6:
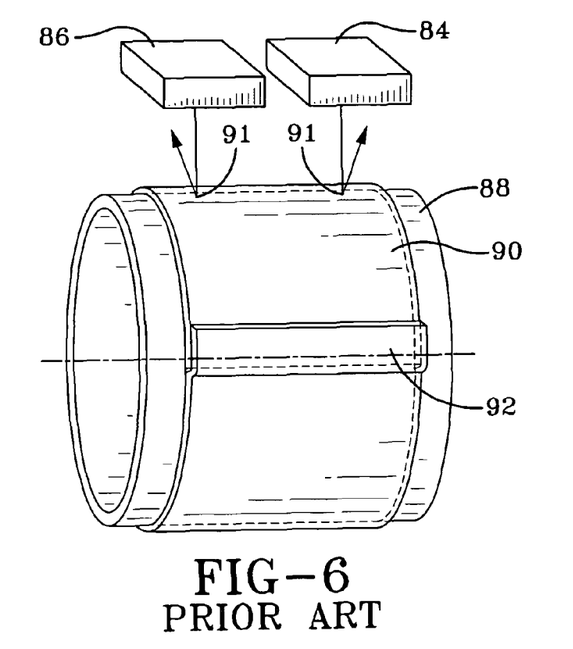
FIG. 6 is a schematic representation of prior art optical point-based scanners directed at a rotating annular surface.
Figure 7:
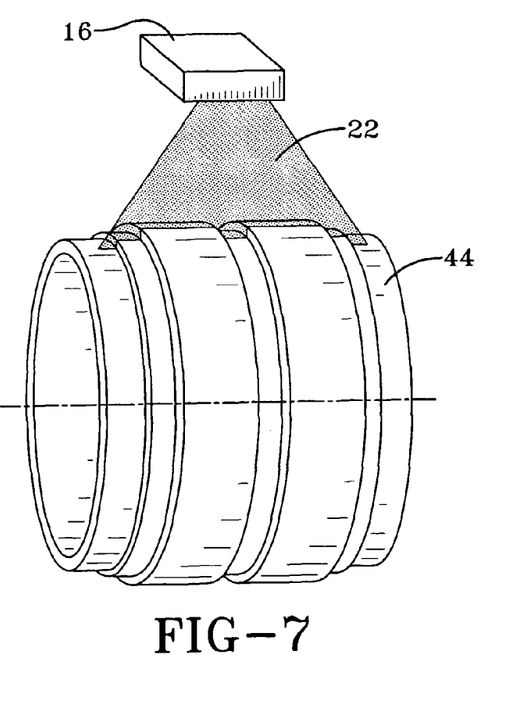
FIG. 7 is a schematic representation of an optical sheet scanner configured pursuant to the invention to scan a rotating annular surface.

Prior art point laser techniques for scanning a component on a toroidal drum is shown by FIG. 6. It will be readily appreciated that a plurality of point laser scanners 84, 86 positioned in scanning relationship to a rotating drum 88 will scan component layer 90 at specific points 91. A splice 92 in the component layer 90 will thus be examined by the laser scanners 84, 86 along a circumferential path defined by the point laser beam as the drum 88 rotates. Anomalies or geometric nonconformities that may exist at other locations will not be identified. As a result, the end product may have an imbalance or uniformity anomaly that will cause the tire to perform less than satisfactorily. The present invention, however, as shown in FIG. 7, uses the sheet of light 22 to scan the entire width of the component on the tire building drum 44. As the green tire build is rotated the scanner 14 will effectively identify any imbalance or geometric non-uniformity issues to allow for imbalance estimation and correction during the green tire build.

Figure 8:
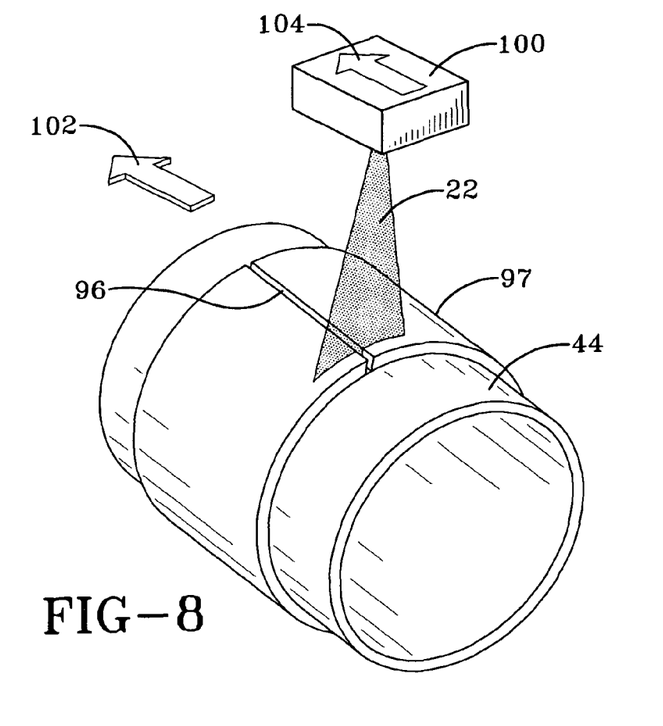
FIG. 8 is a schematic representation of an optical sheet scanner positioned to measure the bulge/valley characteristic of a tire component splice.
Figure 9:
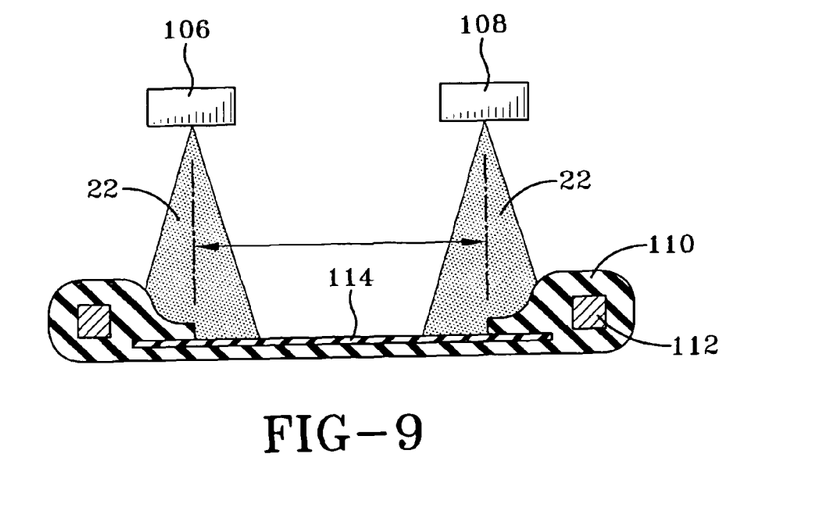
FIG. 9 is a schematic representation of a cross section through a rotating green tire having two optical sheet scanners positioned in scanning relationship thereto.
Figure 10:
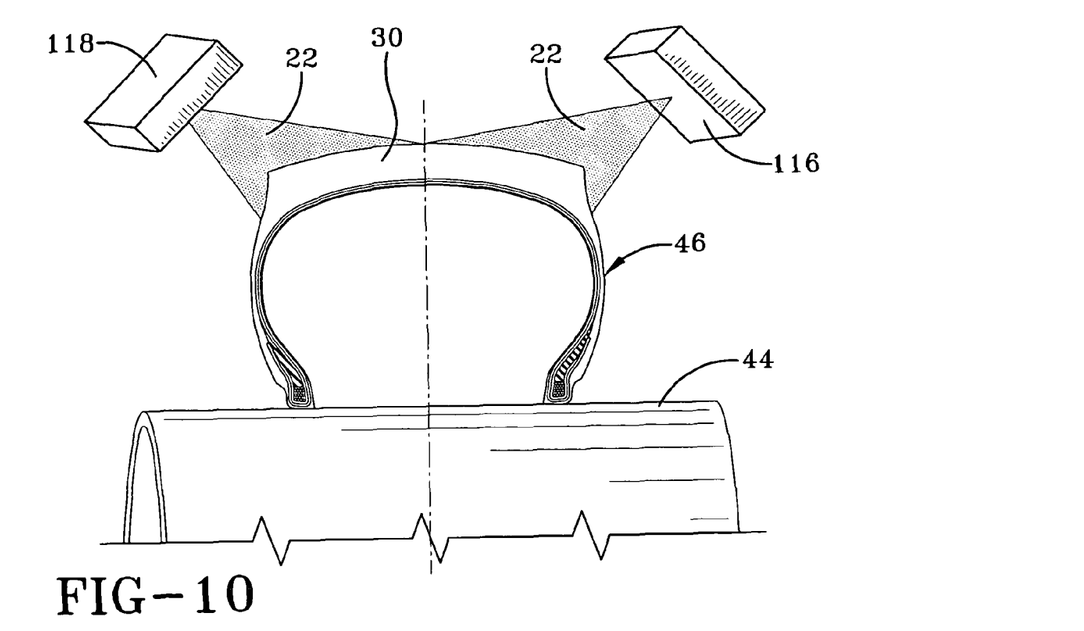
FIG. 10 is a schematic representation of a pair of optical sheet scanners disposed to scan a crown region of a tire.
Figure 11:
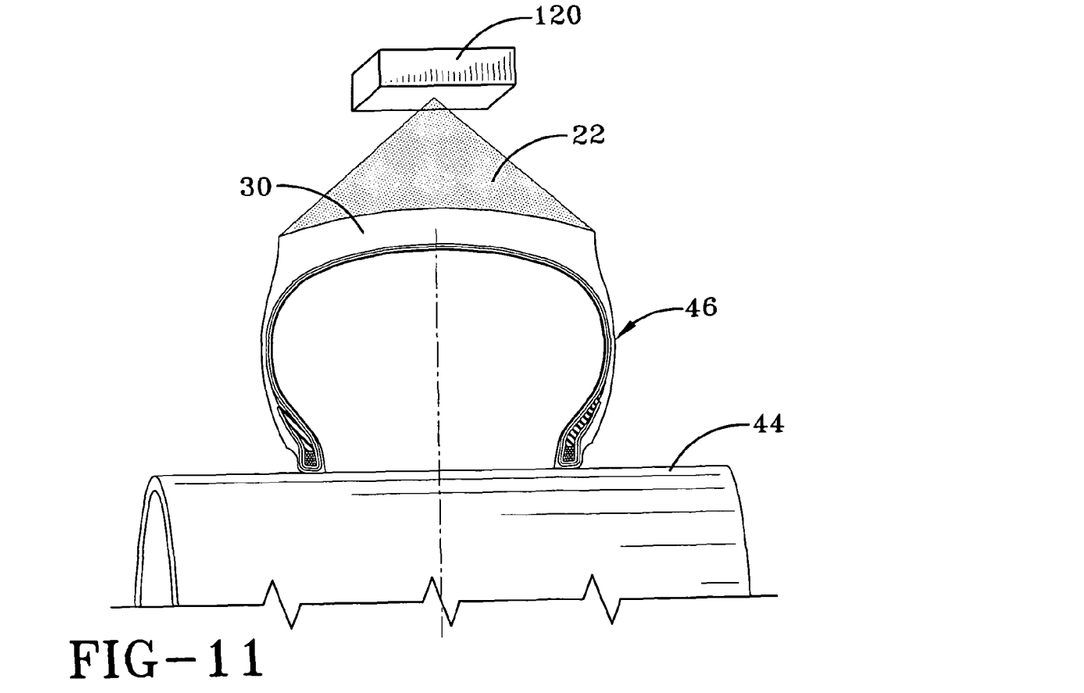
FIG. 11 is a schematic representation of a single optical sheet scanner disposed to scan a crown region of a tire.

Use of an optical sheet scanner may further be used in alternative orientations for the purpose of scanning green tire build components. In FIG. 8, a component layer 94 is applied to a drum 44 and spliced along splice 96. Scanner 100 is positioned and mounted for movement along path 104 and follows the splice 96. Laser triangulation sensors are employed to measure the bulge characteristic of skived splices. The sensors detect open splices and excessive splices to identify splices that are non-conforming to required specifications. FIG. 9 illustrates the use of sheet of light laser sensors 106, 108 for the purpose of scanning the turnup at bead regions 110. The bead regions 110 incorporate beads 112 at opposite sides of the ply component layer 114. FIG. 10 illustrates location of two sheet sensors 116, 118 at an angle with respect to the crown 30 of the green tire carcass 46. FIG. 11 depicts the use of single sheet sensor 120 disposed to direct the sheet of light 22 downward against the crown 30 of the carcass 46.

Figure 12:
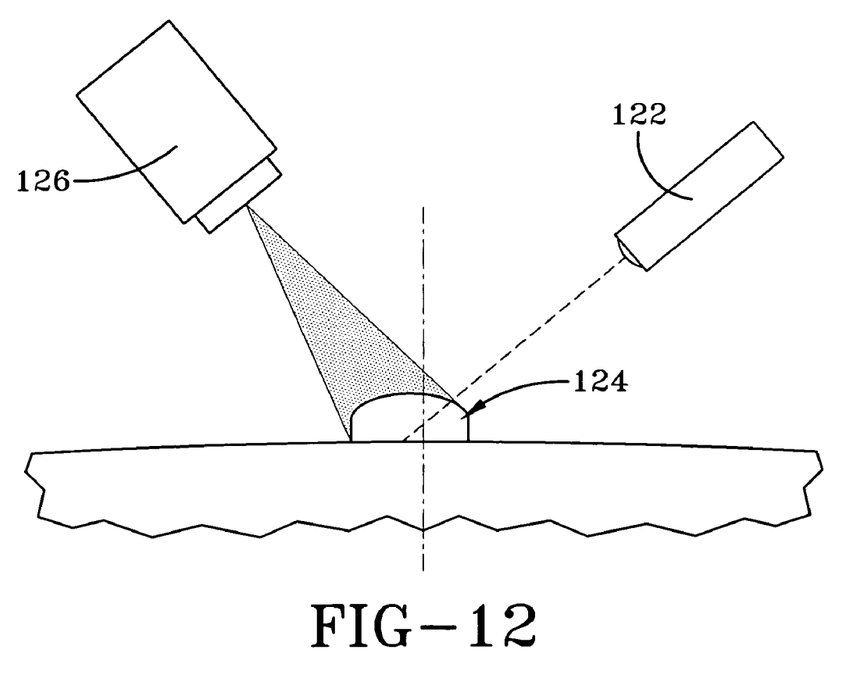
FIG. 12 is a schematic representation of a camera laser triangulation system to detect bulges and lacings in a splice.

Triangulation of a sheet of light sensor 126 with a line laser 122 is shown in FIG. 12 for the purpose of combining to detect the bulge 124 in a component layer. As will be appreciated, the triangulation between a sheet of light laser sensor with other sensor types, such as line laser 122, can identify the three-dimensional configuration and shape of an anomaly such as bulge 124.

Figure 13:
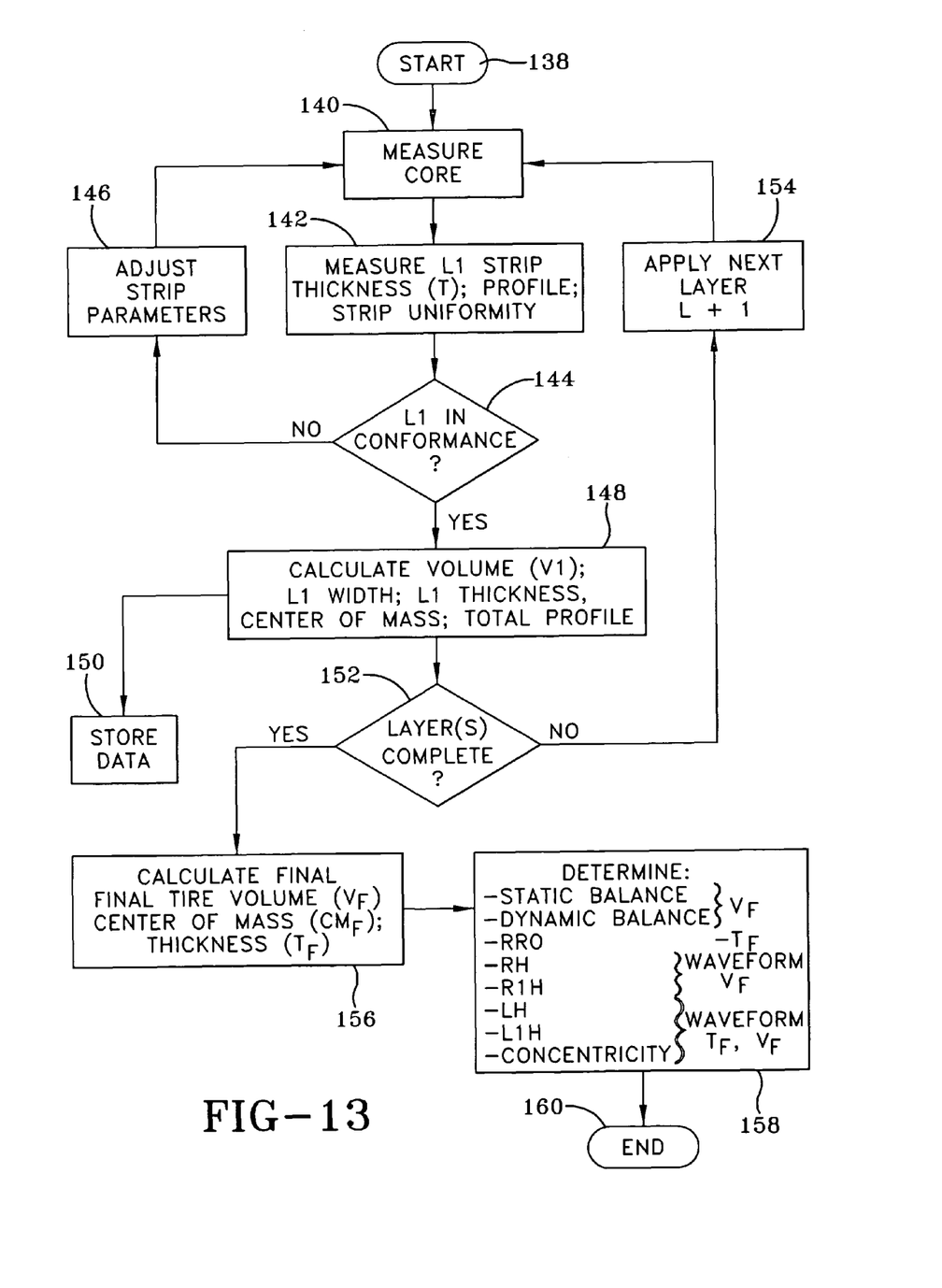
FIG. 13 is a block diagram illustrating the method of measuring a green tire pursuant to the invention.

The method for measuring green tire components and total tire geometric dimensions with a multi-sheet of light dimensional scanner for the purpose of predicting and correcting for imbalance and uniformity anomalies will be understood with reference to the block diagram of FIG. 13 in conjunction with FIGS. 1 and 3. The method shown is for a green tire component assembled to a tire build core in sequential strip form. The method as depicted starts (138) with a measurement (140) by a three-dimensional sheet scanning system of a toroidal surface of a green tire build core. A first strip for a first layer L1 is applied and measured (142) by the three-dimensional sheet scanning system for strip parameters such as thickness, profile, uniformity. Should the strip be non-conforming, (144), a feedback signal is generated to adjust strip parameters (146). Should the strip prove to be in conformance with specification limits, measured data for the strip is stored (150). Subsequent strips are applied and measured by the scanning system until the layer L1 is complete (152). If additional layers are required to complete the green tire build up, a next layer L+1 is applied. The process is repeated until all layers for the green tire carcass are applied. A calculation of final tire volume (VF), center of Mass (CMF); and thickness (TF) is made (156). From the calculated values (156) a determination of Static and Dynamic balance, RRO, RH, R1H, LH, L1H and concentricity (158) of the finished green tire may be made, concluding the method (160). The parameters above are typically used in the tire industry as measurements of Static and Dynamic balance. RRO represents radial runout; RH represents radial harmonic; R1H represents radial first harmonic; LH represents lateral harmonic; L1H represents lateral first harmonic. Final tire volume (VF); Center of Mass (CMF); and final thickness (TF) are also calculations useful in assessing balance, uniformity, and performance characteristics of a finished tire.

From the foregoing, it will be appreciated that the imaging system described above provides real time measurement of a three dimensional tire for contour, mass, and mass distribution. Real time measurement and control of strip dimensions and their location may be made by the system 10. The light sheet scanners may be employed to measure strip by strip construction of a layer or measure a layer applied unitarily. Real time calculation of the static, dynamic balance parameters may be made. In addition, real time calculation of radial, R1H, Lateral, L1H, conicity, runout, may be conducted based on mass distribution. Calculated data is compared against measured uniformity data to provide real time correction of imbalance during green tire build.

During the building of the green tire, the sheet of light optical scanner(s) measure the entire toroidal surface. Multiple scans and measurements of the geometric build-up of each component are made to determine centroids and differential masses of component cross-sections. Each tire component may be modeled as point masses located on a circumferential ring located at the cross-sectional centroids. The mass properties of the green tire may thus be approximated in order to determine tire imbalance.

The subject system and method measures components and the total green tire as it is constructed, and then dynamically correct for any imbalance as the green tire is built. The methodology may be extrapolated to monitor and control the geometric influence on other uniformity parameters such as force variation, circumferential runout, bulge and valley, high speed uniformity, etc. Through the integrated multi-sheet of light optical system, a 180 degree station 12 is provided to scan and measure at high speed the entire toroid, as well as each component built up on the tire. Single point laser gauge systems that measure particular spots on the green tire cannot detect all existing uniformity or geometric anomalies present. The present invention methodology and apparatus can measure the entire toroid with multiple scans to quickly obtain sufficient geometric data required to correlate, predict, and correct for imbalance and uniformity anomalies.

What is claimed is:

1. A control system for the formation of a green tire on a target region of a curved build surface, comprising:
   means rotating the curved build surface, the target region comprising a toroidal tire build region of the curved build surface;
   means scanning and measuring substantially the entirety of the target region of the build surface during component by component green tire build-up on the target region;
   the means scanning and measuring substantially the entirety of the target region measuring the geometric component by component build-up on the target region and generating incremental real time measurement data for each component during a green tire build-up, the data representing a plurality of component parameters taken from the group: (component profile, component uniformity, component dimensions);
   means calculating a cumulative effect of each component added to the target region in real time to determine the work-in-process balance parameters of the green tire during component by component build-up on the target region based upon the measurement data;
   means generating real time calculation data of at least one final green tire parameter based upon the cumulative measurement data from the added components.

2. A control system according to claim 1, wherein the final green tire parameter is from the group (radial run out; radial harmonic; radial first harmonic; lateral harmonic; lateral first harmonic; final tire volume; final tire center of mass; final tire thickness).

3. A control system according to claim 1, further comprising:
   means comparing a pre-determined specification limit data to the measurement data;
   means generating at least one feedback control signal based upon the comparison of the pre-determined specification limit data to the measurement data.

4. A control system according to claim 3, wherein further comprising means responsive to the control signal and adjusting in real time at least one component characteristic during component by component green tire build up.

5. A control system according to claim 1, wherein the means scanning and measuring substantially the entirety of the target region of the build surface during component by component green tire build-up comprises a plurality of optical scanners, each scanner operatively disposed to direct an optical sheet of light on a designated portion of the target region of the build surface to measure geometric build-up on the respective designated portion, a cumulative effect of the plurality of optical scanners scanning substantially the entirety of the target region of the build surface.

6. A control system according to claim 5, wherein the optical scanners measure component by component build up of the green tire on the target region in real time.

7. A control system according to claim 1, wherein further comprising means calculating from the measurement data at least one final green tire metric taken from the group: (final tire volume; final tire center of mass; final tire thickness).

8. A control system according to claim 7, wherein further comprising means determining from the final green tire metric at least one final green tire parameter from the group: (radial run out; radial harmonic; radial first harmonic; lateral harmonic; lateral first harmonic).

9. A control system according to claim 1, wherein the target region is configured to comprise substantially the entirety of a tire body and the means scanning and measuring the entirety of the target region comprises a means operative to scan a toroidal surface.

10. A control system according to claim 9, wherein the one final green tire parameter comprises a balance parameter of a finally configured green tire.

11. A control system according to claim 1, wherein the means scanning and measuring comprises means conducting at least one toroidal surface scan and measurement for each component by component green tire build-up on the target region.

* * * * *